(12) United States Patent
Folmer et al.

(10) Patent No.: US 9,122,772 B2
(45) Date of Patent: Sep. 1, 2015

(54) METHOD FOR ANALYZING MESSAGE ARCHIVES AND CORRESPONDING COMPUTER PROGRAM

(75) Inventors: Jens Folmer, Garching b. München (DE); Uwe Katzke, Aachen (DE); Dorothea Pantförder, Garching b. München (DE); Bernd-Markus Pfeiffer, Wörth (DE); Birgit Vogel-Heuser, Garching b. München (DE)

(73) Assignee: Siemens Aktiengesellschaft, Munich (DE)

( * ) Notice: Subject to any disclaimer, the term of this patent is extended or adjusted under 35 U.S.C. 154(b) by 554 days.

(21) Appl. No.: 13/321,506

(22) PCT Filed: May 18, 2009

(86) PCT No.: PCT/EP2009/003523
§ 371 (c)(1),
(2), (4) Date: Apr. 26, 2012

(87) PCT Pub. No.: WO2010/133234
PCT Pub. Date: Nov. 25, 2010

(65) Prior Publication Data
US 2012/0203543 A1 Aug. 9, 2012

(51) Int. Cl.
*G06F 17/21* (2006.01)
*G06F 17/27* (2006.01)
*G06F 17/30* (2006.01)

(52) U.S. Cl.
CPC .................. *G06F 17/30985* (2013.01)

(58) Field of Classification Search
CPC ....... G06F 11/079; G06F 11/00; G06F 17/27; G08B 25/14; H04L 41/0613; H04L 41/065
USPC ......................... 704/9; 340/521, 506
See application file for complete search history.

(56) References Cited

U.S. PATENT DOCUMENTS 4,977,390 A * 12/1990 Saylor et al. .................. 340/521
6,324,655 B1 * 11/2001 Matoba et al. ............... 714/6.32
(Continued)

FOREIGN PATENT DOCUMENTS

CN 1996208 A 7/2007
WO WO 2004/114133 * 12/2004
(Continued)

OTHER PUBLICATIONS

Koskenniemi, K., Tapanainen, P., & Voutilainen, A. (Aug. 1992). Compiling and using finite-state syntactic rules. In Proceedings of the 14th conference on Computational linguistics-vol. 1 (pp. 156-162). Association for Computational Linguistics.*
(Continued)

*Primary Examiner* — Vincent P Harper
(74) *Attorney, Agent, or Firm* — Cozen O'Connor (57) ABSTRACT

A method for analyzing a large number of messages, wherein the number of messages is reduced based on pattern recognition and pattern simplification, rules for the pattern recognition and pattern simplification are based on a regular grammatical structure, and patterns are sought in the remaining messages, or directly, i.e., without previous simplification. Syntactic pattern recognition is used for each type of pattern search, and a finite machine is derivable using the regular grammatical structure underlying each pattern recognition by transforming the mapping rules into transfer function, such that structural connections between the messages can be displayed graphically.

18 Claims, 5 Drawing Sheets

(56) References Cited

U.S. PATENT DOCUMENTS

| | | | | |
|---|---|---|---|---|
| 6,947,797 | B2 * | 9/2005 | Dean et al. | 700/79 |
| 8,191,099 | B2 * | 5/2012 | Johnson et al. | 725/107 |
| 2008/0316015 | A1 | 12/2008 | Naedele et al. | |

FOREIGN PATENT DOCUMENTS

| | | |
|---|---|---|
| WO | WO 2004114133 | 12/2004 |
| WO | WO 2006000110 | 1/2006 |

OTHER PUBLICATIONS

Weiss, Gary M., and Haym Hirsh. "Learning to Predict Rare Events in Event Sequences." KDD. 1998.*

Oates, Tim, and Paul R. Cohen. "Searching for structure in multiple streams of data." ICML. vol. 96. 1996.*

Klemettinen, Mika, Heikki Mannila, and Hannu Toivonen. "Rule discovery in telecommunication alarm data." Journal of Network and Systems Management 7.4 (1999): 395-423.*

* cited by examiner

METHOD FOR ANALYZING MESSAGE ARCHIVES AND CORRESPONDING COMPUTER PROGRAM

CROSS-REFERENCE TO RELATED APPLICATIONS

This is a U.S. national stage of application No. PCT/EP2009/003523 filed 18 May 2009, the content of which is incorporated herein by reference in its entirety.

BACKGROUND OF THE INVENTION

Field of the Invention

The invention relates to message archiving and, more particularly, to a method for analyzing a set or sequence of messages generated while controlling and/or monitoring a technical process, the abovementioned set/sequence also being referred to as message archive for short below. In this case, for each message, an item of time information that codes the occurrence of the latter and a characteristic identification are recorded. The invention also relates to a method for operating an automation system that generates or receives messages which thus grow over time to form a message archive to which the analysis method in accordance with the invention can be applied or is applied.

WO 2006/000110 A1 discloses methods for analyzing sequences of individual messages. The described approach is aimed at suppressing redundant messages. Here, redundant messages are intended to be detected by investigating whether a message under consideration goes back to boundary conditions that are already certain to be the cause of known messages.

SUMMARY OF THE INVENTION

In the approach according to the invention, it is a priority to reduce or structure a number of automatically generated messages. Messages from technical processes and/or from automation systems intended to control and/or monitor the processes, i.e., systems for automating industrial processes (industrial automation systems), with which the invention deals in principle, are intended for human operating staff (operators) to indicate states of the process or of the automation system that require an immediate response from the operator because they indicate possible faults or exceptional situations, for example.

However, it has often been shown in this case that particular situations trigger a real flood of messages—referred to in the specialist literature as a message flood and sometimes also as an "alarm shower"—with the result that it is more difficult to provide the operator with the information actually sought because the operator is overtaxed by the number of messages that occur at the same time or in close temporal relation. It is often no longer possible for the operator to discern "important" messages in such a situation, with the result that no timely intervention occurs in practice, for example, in an exceptional situation indicated per se by individual messages, and production failures then result, for example.

It is thus an object of the invention to provide a method for determining how message archives, i.e., a set of messages which have already accrued, can be analyzed to help a programmer based on the analysis result. This is because the programmer creates an automation solution for the automation system intended to control and/or monitor the technical process and the help is intended to give suggestions of how, for example, alarm management and the messages to be emitted if alarms occur should be planned, thus resulting in the ability to generate messages in a structured manner with a number of messages is reduced overall. The intended result of such optimization is that the messages which have been generated can be better understood and/or are easier to review by the respective operator.

This and other objects and advantages are achieved in a method for analyzing a set of messages which are generated while controlling and/or monitoring a technical process, i.e., an industrial technical process, and for each of which an item of time information that codes the occurrence of the messages and a characteristic identification are recorded, provision is made for a search to be performed for patterns in a sequence of identifications which has been sorted according to the time information and for recognized patterns to be replaced with an identification which characterizes the pattern.

The invention thus considers past messages and, as the pattern, it is possible to search for similar, respectively successive messages, for example. Messages such as "temperature exceeded in silo 3-37°" and "temperature exceeded in silo 3-39°" are not identical messages but are examples of similar messages. If every such message indicating that the temperature has been exceeded is followed by an alarm as a further message, a pattern which can be recognized by the method results in each case.

The messages each relate to a particular event in a unit or system part. Such messages can be described by a characteristic identification; the identification thus represents the underlying message. The manner in which a characteristic identification is derived remains reserved for the respective implementation. It is relevant to the invention that each message is represented by a characteristic identification, and the process of searching for pairs of messages or groups of messages is facilitated by the fact that the search relates to identifications generated using the underlying messages. Therefore, in a sequence of messages, it is not necessary to analyze every individual message, but rather a sequence of identifications is analyzed instead. Here, every identification can be interpreted as a symbol and the sequence of identifications can be interpreted as a symbol sequence.

The terms symbol, identification and message are used synonymously below where something else does not emerge from the context. The same applies to the terms symbol sequence, sequence of identifications and message archive. An identification is characteristic of the underlying message. As a result, it is also justified against this background to interpret the approach in accordance with the invention as a search for patterns in a sequence of messages with a subsequent reduction in the messages recognized as a pattern.

The message archive may comprise a database comprising only the identifications or only the messages (optionally with the respective identifications) or may result from the messages at the runtime and is thus an actual or at least conceptual combination of all messages or all identifications generated for said messages. The symbol sequence to be investigated can thus be included in the message archive or may result from the message archive.

By virtue of the fact that recognized patterns in the symbol sequence are replaced with an identification which characterizes the pattern, the symbol sequence and—at least indirectly—the underlying message archive are reduced, for example, in the form of an at least temporary copy of the message archive that is reduced according to the resultant reduced symbol sequence and is displayed or the like in this form. Groups of symbols, i.e., pairs of symbols, are taken into account during the search for patterns in the symbol sequence. Here, successive symbols/identifications, i.e., groups or pairs of symbols/identifications, with the highest occurrence are preferably reduced by regular grammar. This reduction occurs iteratively until all occurring groups/pairs are contained only once in the symbol sequence.

Unlike WO 2006/000110 A1, for example, the analysis in accordance with the invention therefore does not relate to process states or other states as suspected causes of individual messages but rather to the messages themselves and here to a set of messages, for example, a message archive, in which hundreds or thousands of messages, as have actually already occurred while monitoring a particular technical process, have been or can be combined.

The invention also relates to a method for operating an automation device, i.e., an industrial automation device in the manner of a process computer, a programmable logic controller or the like, which performs the analysis method presented above and described in more detail below. Such an automation device may permanently or temporarily form part of an automation system for controlling and/or monitoring a specific technical process. Whereas the abovementioned analysis method can be perform in a manner decoupled from the technical process and/or from the associated automation system, an automation device which, as part of an automation system, performs the analysis method makes it possible to perform an analysis which, although performed retrospectively, can be performed online and thus can be incorporated in the continuous operation of the process and of the automation system. For this purpose, the automation device receives or under certain circumstances even itself generates the messages to be analyzed and, for each message, an item of time information that codes the occurrence of each message and a characteristic identification are recorded. As a result, after the analysis method (already described) perform by the automation device or within the scope of the method for operating the automation device, a search is or can be performed for patterns in a sequence of identifications that has been sorted according to the time information and recognized patterns are or can be replaced with an identification that characterizes the pattern.

The advantage of the invention is that, as a result of the recognition of patterns, the set of messages included in a message archive can be structured, with the result that knowledge which can be incorporated in message and alarm planning can be derived from recognized structures. As a result, the automation solution i.e., either the automation system with automation devices included in the automation system as hardware for controlling and/or monitoring the technical process or one or more control programs executed by the automation device(s) as software, can then be designed in such a manner that fewer messages or associated messages as such are generated overall. The invention thus substantially assists a programmer or planner of the automation solution to find or improve planning of the respective automation solution that is favorable in terms of the volume of messages.

In accordance with the invention, if the automation device itself generates the messages and/or receives them from the technical process or from other automation devices involved in controlling or monitoring the process, the automation device which performs the analysis method effectively acts as a collecting point for the messages that occur overall. In addition to the analysis, for example, such an automation device can also undertake other tasks, for example, logging of messages which occur, with the result that, with such a configuration, the result of such continuous logging can be directly used in a particularly preferred manner as a message archive to which the analysis method relates.

After a characteristic identification has been generated or recorded for each of the messages, for example a numerical, alphanumeric or mixed identification that codes the message according to its type and/or its contents, such as, "F" for fault messages or "A" for alarms, the search is performed for patterns in the temporally sorted sequence of such identifications (symbols) that is referred to here and below as a symbol sequence. Here, syntactic pattern recognition methods are used to search for patterns. A characteristic identification is always constant for identical or similar messages that occur (for example "A" for alarms) or is constant at least with regard to a characterizing part (for example, "A1", "A19", "A21", etc. for different alarms with the alphanumeric part as the constant characterizing part). In the case of identical or similar messages which occur at different times, recurring symbols/identifications arise in the symbol sequence, with the result that pattern recognition performed on a syntactic basis is possible with respect to such regularities.

Successive symbols, i.e., for example, a group of successive symbols ("FFA") or pairs of successive symbols ("FA"), are replaced with a symbol that characterizes the recognized pattern. The symbol sequence is thus shortened and the shortening operation is preferably performed based on one or more rules of regular grammar. A search is thus performed for recurring identical groups or pairs (patterns) within the symbol sequence and the groups or pairs are shortened by a clear regular grammar rule. A definition of the technical term "regular grammar", as used at the time of the application for the present invention, is as follows: "In theoretical computer science, formal type-3 grammars of the Chomsky hierarchy are also called regular grammars. The languages which can be produced by these grammars are accordingly called regular languages."

In a first step or method stage of the pattern search, the analysis involves searching only for groups/pairs of symbols that go back to individual messages. In the next iteration, symbols which have been introduced into the symbol sequence by shortening operations which have already occurred are also incorporated in the analysis to find further recurring groups/pairs by treating them as a symbol which goes back to an individual message, etc.

Irrespective of the type of search for patterns in the symbol sequence, it may be expedient to reduce the scope of the symbol sequence, which is advantageously effected by hiding, in the symbol sequence, those symbols belonging to messages which satisfy predefined or predefinable criteria. In this manner, the set of messages to be searched can also arise as a subset of all messages generated by the process, such as only incoming messages or only process alarms. A preferred variant or alternative also involves the criterion or criteria relating to affiliation of a message to a system part of the technical process and/or a part of an automation system intended to control or monitor the process. In this manner, the symbol sequence can be effectively filtered before the search for patterns, with the result that the symbol sequence comprises only identifications for messages which satisfy a predefined criterion, i.e., the affiliation of a message to a particular system part of the technical process, for instance. In this manner, a complex overall system, as often arises when controlling or monitoring industrial technical processes, i.e., industrial production processes, can be subdivided into smaller units. This subdivision reduces the amount of data under consideration and also counteracts a combinational explosion in the search for patterns.

A symbol sequence corresponding to the contents of a message archive can thus be broken down into partial sequences depending on particular criteria, and each partial sequence represents a separate symbol sequence to which the pattern search in accordance with the method of the invention relates. Each criterion that is set for breakdown purposes represents, as it were, a filter for an original symbol sequence and provides a reduced symbol sequence that satisfies the respective filter. Expert knowledge of the respective system is generally needed to determine the filter, i.e., the or each underlying criterion. For example, a set of alarm data or the overshooting of an interval of time, come into consideration as criteria. Alternatively or additionally, aspects such as the type of message (alarm, fault, etc.) or the origin of the message (system, system part, units, etc.) also come into consideration as criteria. Each partial sequence of this type can be interpreted as a symbol sequence and can be reduced by searching for patterns and replacing recognized patterns.

An intelligent filter can also be used to recognize periodicities and to form a partial sequence (message window) based thereon. A partial sequence is detected as soon as the interval of time between adjacent symbols/messages (patterns) exceeds a time limit which has been input by the user. This signals the end of the partial sequence and the beginning of a new partial sequence. Each partial sequence can be interpreted as a symbol sequence and treated like one, as described above.

It is known from theoretical computer science that regular grammar can be represented by a finite automaton, more precisely by transforming the respective mapping rules into transition functions. As a result, structural relationships between the messages are graphically represented or can be graphically represented using the resultant paths in the finite automaton. One preferred embodiment of the invention accordingly involves deriving a corresponding finite automaton from the regular grammar used for the shortening operation.

As an alternative or in addition to the syntactic pattern recognition, filtering, regular grammar etc., it is also possible to statistically analyze the messages, with the result that a more preferred embodiment of the invention provides for recognized patterns which occur with a frequency which exceeds a predefined or predefinable threshold value to be represented in a hit-list.

The described method with its refinements is preferably implemented using software. The invention accordingly also relates to a computer program having program code instructions which can be executed by a computer and are intended to implement the method described here and below when the computer program is executed on a computer, i.e., an automation device having a processing unit in the manner of a processor or the like, for example. An automation device, i.e., an industrial automation device, on which such a computer program has been loaded is an example of a computer system to which the invention likewise relates. Instead of the automation device, standard computers, as are customary nowadays in office automation, also come into consideration. The computer program for implementing the method is usually held on or in a storage medium, i.e., on a magnetic or optical data storage medium or in a semiconductor memory, for example, i.e., volatile or non-volatile memory modules, for example, with the result that the invention, in this respect, also relates to a storage medium having a computer program which can be executed by a computer and is intended to implement the method.

The method and its refinements are based on regular grammars (regular languages) and finite automatons which are known from theoretical computer science. In principle, individual messages (message sequences) which temporally follow one another in pairs or groups are shortened by a regular grammar rule. Instead of considering the individual messages, identifications/symbols generated for the individual messages are also considered, as described. Gradual shortening by such rules creates message sequences of any desired quantity, the rules arising over the course of the method on the basis of the patterns recognized in each case (one rule for each pattern). As a result of properties that are linked to individual messages and code a source of the message, for example, or on account of sequences of successive individual messages etc., it is possible to recognize combinational dependences and in this way to structurally analyze alarm showers. It is additionally possible to tie particular criteria to the rules. Here, it can be stated that only particular types of messages, messages from particular system parts, incoming or outgoing messages, etc. are considered, with the result that only a selected subset of the total data is considered.

The practice of shortening a symbol sequence can be used to eliminate interference between other symbols. These other symbols may represent, for example, "actually relevant messages". The shortening operation is then used to effectively highlight the symbols that remain after the shortening operation, while the symbols introduced into the symbol sequence as a result of the shortening operation are of subordinate importance during further analysis. The shortening operation may also be aimed at recognizing structural and systematic relationships between messages that have accrued. The symbols that are introduced into the symbol sequence as a result of the shortening operation are then the actual analysis result, while the symbols that remain in the symbol sequence and directly go back to messages that have been received take a back seat. Both variants can be interpreted as recognized message patterns. Frequently recurring message patterns are presented in a hit-list to obtain indications of devices or system parts with a particularly high load and of faults in the message planning, for example, of a control system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below using the drawing. Items or elements which correspond to one another are provided with the same reference symbols in all figures. The or each exemplary embodiment should not be understood as a restriction of the invention. Rather, numerous alterations and modifications, in particular those variants and combinations which can be gathered by a person skilled in the art with regard to achieving the object, for example by combining or modifying individual features and elements or method steps which are described in connection with the general or specific part of the description and are contained in the claims and/or the drawing, and, as a result of features which can be combined, result in new subject matter or in new method steps or sequences of method steps, are possible within the scope of the present disclosure.

In the drawings.

DESCRIPTION OF THE PREFERRED EMBODIMENTS

Figure 1:
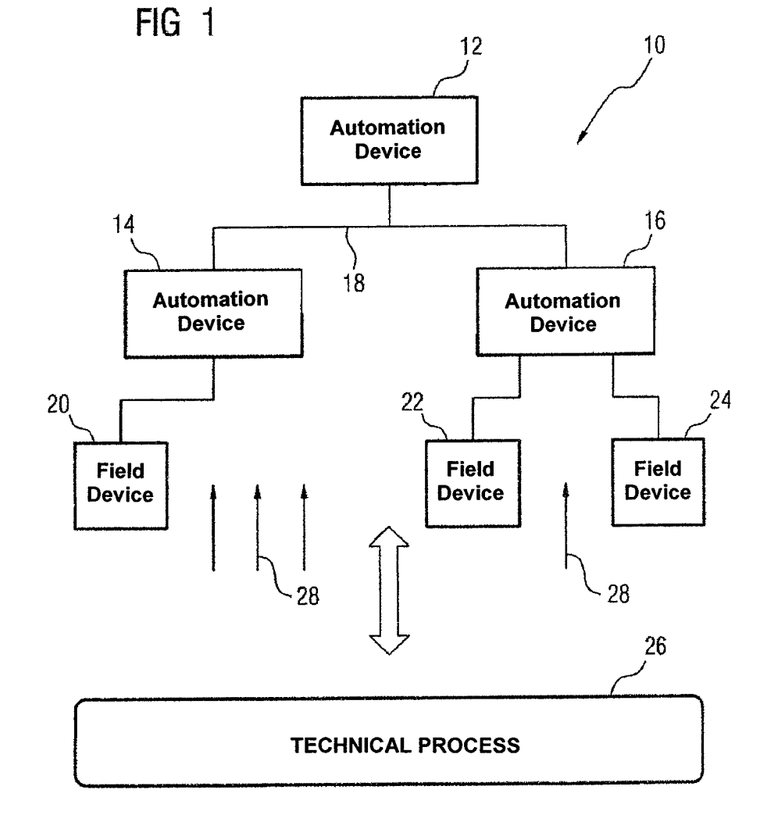
FIG. 1 shows an exemplary automation system.

FIG. 1 shows a diagrammatically simplified illustration of an industrial automation system 10 (automation system) having a plurality of industrial automation devices 12, 14, 16 (automation devices), a superordinate automation device 12 that acts as a control system, for example, and which automation devices are communicatively connected to one another, for example over a bus 18. The automation devices 12, 14, 16 interact directly or indirectly, for example, through connected field devices 20, 22, 24, with a technical process 26 (not illustrated in any more detail), for the automation of which, i.e., for the control and monitoring of which, the automation system 10 is provided. The technical process is an industrial production process, for example.

The entirety of the automation system 10 and a control program (not illustrated) executed by the automation system 10, i.e., the devices 12, 14, 16, 20, 22, 24 included in the system, is referred to as an automation solution. Such an automation solution always specifically refers to a specific technical process 26. As a result, the technical process 26 itself can also be considered to be concomitantly included in the automation solution.

The practice of controlling and/or monitoring technical processes 26 by an automation system 10, as illustrated in FIG. 1, is known per se. It is also known that messages 28, which are shown only in a diagrammatically simplified manner in the illustration of FIG. 1, are generated while controlling or monitoring the technical process 26. Such messages 28 may be indications of faults or exceptional situations, such as, indications of limit values that have been reached or exceeded and the like. However, such messages 28 need not necessarily have their origin in the technical process 26, but rather may also relate to the status of the automation system 10 and may indicate, as an exceptional situation, the failure or another functional impairment of one of the devices 12, 14, 16, 20, 22, 24 included in the automation system 10, for example.

The type and origin of such messages 28 is extremely diverse beyond the examples mentioned, and every message 28 generated or processed in the automation system 10, i.e., every message that indicates a deviation from expected operation, is intended to be considered below as being included in the designation of message 28.

However, it has been shown that, in particular operating situations, such a plethora of messages 28 (message flood, alarm shower) occurs that it is difficult for an operator supervising the automation system 10 and the technical process to maintain an overview and to initiate suitable countermeasures in the event of possible serious faults.

It has hitherto often been the case that the operator uses his practical knowledge gathered through training and by dealing with the system, i.e., the automation system 10 and the technical process 26, to be able to quickly eliminate faults and the like that interfere with the operation of the system. By anticipation, an attempt is made to prevent effects, which becomes increasingly more difficult and more risky in complex systems. It is partially known from experience which measures are required in particular message floods. It is often also possible to already react to particular effects of a cause of a particular message because the respective cause is known from experience, i.e., from messages 28 received in the past, and a cause recognized in the process.

An automated approach for restricting the message flood, which is not exclusively based on the experience of the operators in question, has been disclosed with the process control system sold by the applicants of the present invention under the trademark SIMATIC PCS7. There, it is possible to define, during planning, system and operating states which each require or entail a different reporting behavior. In particular system states, superfluous messages can be prevented as early as during generation or further processing based on logic combinations. In addition, individual types of messages (alarms) can be effectively hidden, i.e., they are not displayed to the operator but are still stored in a message archive. When structuring accrued messages 28, it is important to concentrate on essential messages 28. It is also possible to use filters that cause particular types of messages to be hidden depending on the operator. In addition, the allocation of priorities also comes into consideration for the purpose of structuring messages, with the result that less important messages or less relevant messages can be identified as such.

Figure 2:
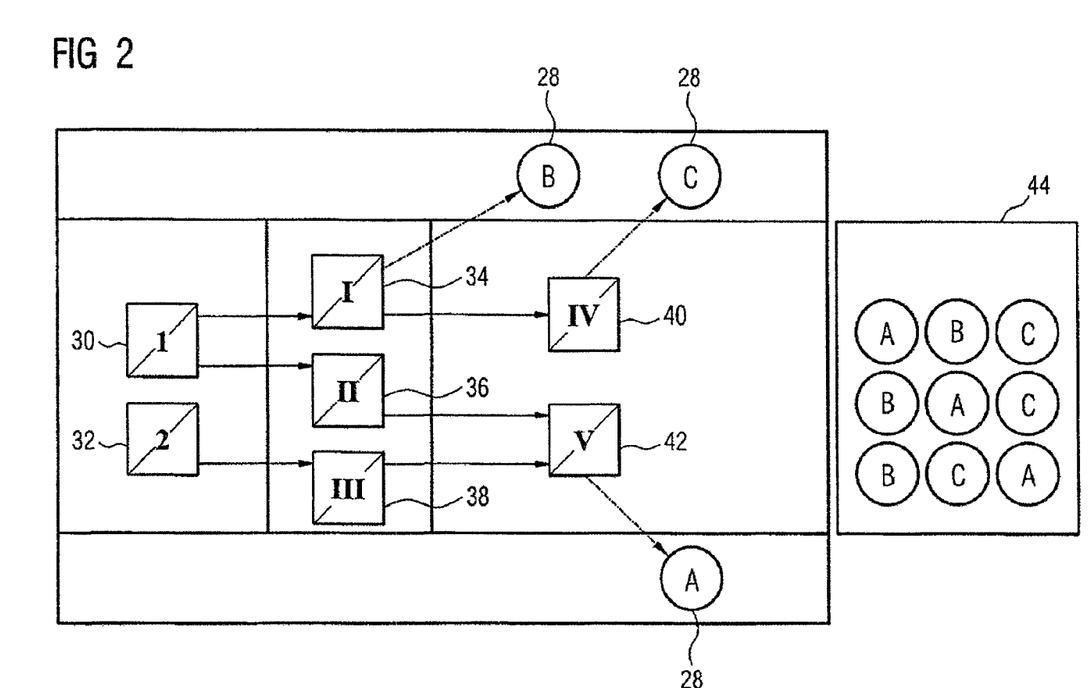
FIG. 2 shows an illustration for describing the problem on which the invention is based.

FIG. 2 shows an illustration for illustrating the problem on which the invention is based. Here, a first cause 30 and a second cause 32 may result in a first effect 34, a second effect 36 and a third effect 38. Individual effects 34, 36, 38 may also entail knock-on effects 40, 42. Messages 28 (cf. also FIG. 2) are generated in this case based on the first effect 34, the first knock-on effect 40 and the second knock-on effect 42. As shown on the right-hand side of the illustration in FIG. 2, a plurality of different combinations 44 may result for the order in which the messages 28 occur. In order to distinguish between individual messages 28 in a group of messages, reference is also made below to the illustrated symbols, namely A, B, C, which can also be interpreted as a graphical representation of a characteristic identification which can be recorded or derived for each message 28. This notation can be used to determine that the message B is generated by the first effect 34. The first effect 34 also entails the first knock-on effect 40 which in turn results in the message C. The second effect 36 results in a different effect path that also generates a message A, however. As a result, there is a causal relationship between the messages B and C but not between the messages A and B or A and C, which results in different possible combinations 44 of messages 28 from the scenario illustrated in FIG. 2 in a message archive.

Figure 3:
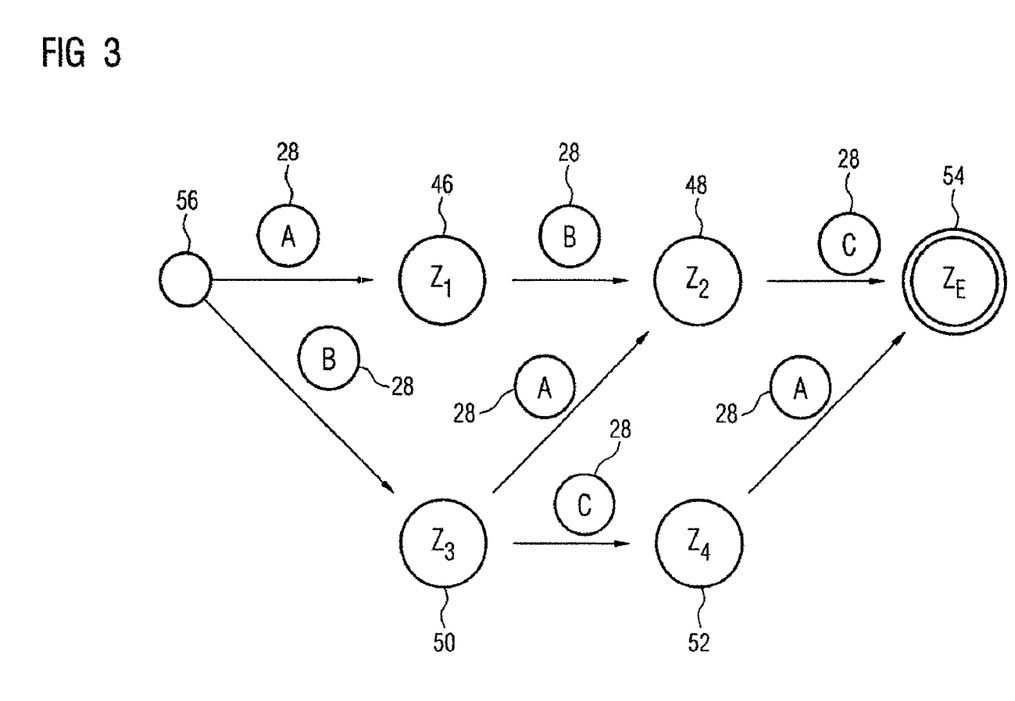
FIG. 3 shows the interactions from the scenario according to FIG. 2 as a result of mapping rules on which a finite automaton is based.

FIG. 3 shows the interactions from the scenario according to FIG. 2 as a result of mapping rules on which a finite automaton is based. In this case, the units Z1, Z2, Z3, Z4 and ZE denote different states of the finite automaton, i.e., a first state 46, a second state 48, a third state 50 and a fourth state 52 and then a final state 54 that is opposite a starting state 56 in the illustration in FIG. 3. Depending on the message 28 which has been generated or has occurred, the finite automaton changes to a particular state, i.e., changes to the first state Z1 when the message A initially occurs, for example. Depending on whether the final state 54 ZE is reached via the states 46, 48 Z1, Z2 or the states 48, 50 Z2, Z3 or the states 50, 52 Z3, Z4, different combinations 44 (FIG. 2) in the order of the messages 28 that have occurred result. Representing underlying interactions in a finite automaton makes it possible for knowledge which can be derived therefrom to be included in the engineering or re-engineering of message planning to reduce message sequences (A, B, C; B, A, C; B, C, A; etc.) to one message, for example, by generating and displaying a message only for the underlying cause overall, for example. This makes it possible to ease the burden on the operator.

Figure 4:
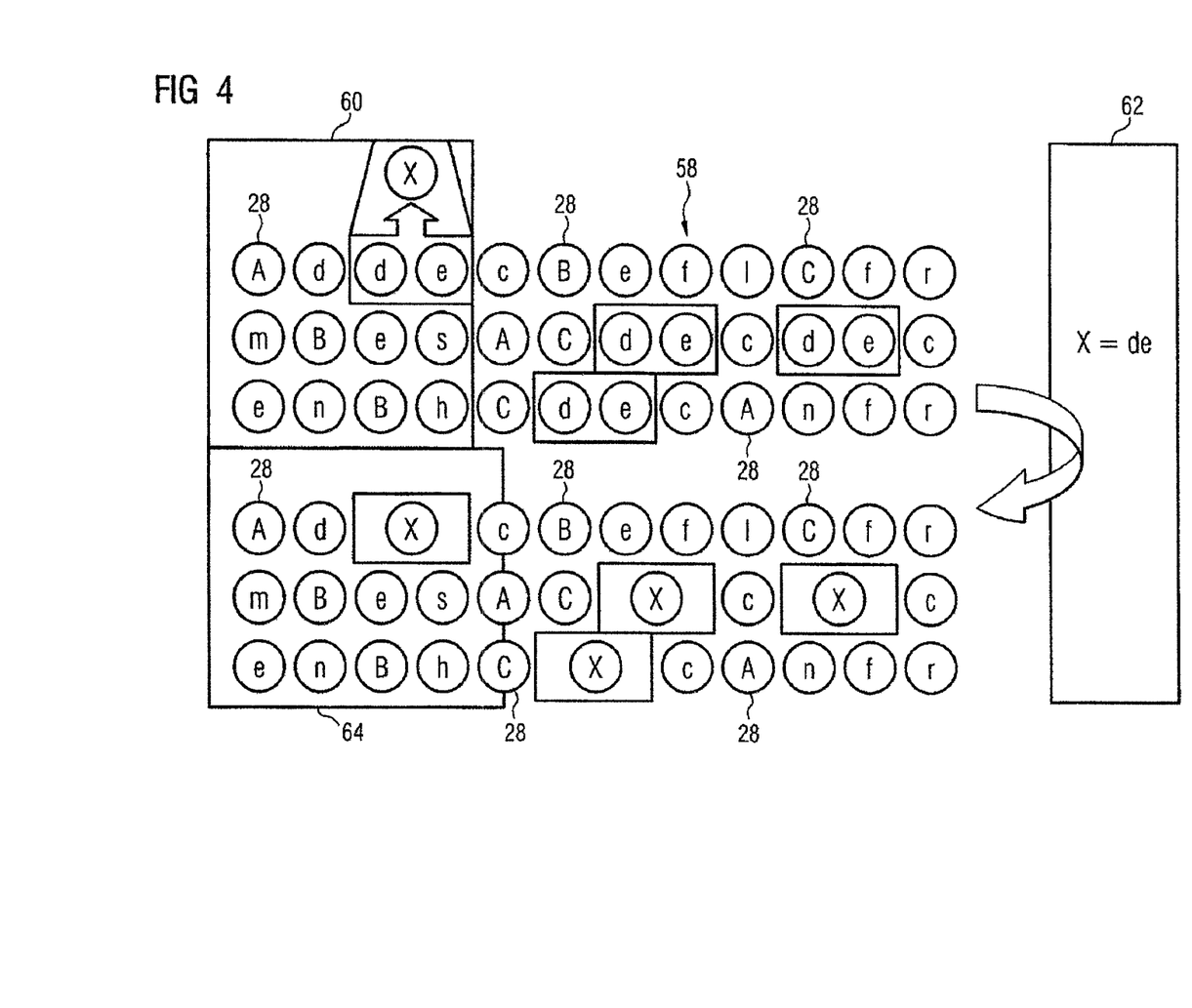
FIG. 4 shows another embodiment of the invention using an exemplary larger set of messages.

FIG. 4 is intended to illustrate the method in accordance with the invention using the example of a larger set of messages A, B, C, c, d, e, f, etc., i.e., a more comprehensive message archive 58. The message archive 58 also comprises the messages 28 which were previously discussed using the illustrations in FIG. 2 and FIG. 3. A message itself or an identification which is characteristic of the message 28, i.e., a symbol, illustrated here using the identifications (symbols) A-C, c, d, e, etc., can be recorded in the message archive 58. The messages 28 are also stored in chronological order in the message archive 58, i.e., the messages 28 are sorted according to an item of time information which codes the occurrence of the messages, thus resulting in a temporally sorted symbol sequence. In the simplest case, such sorting may also result from the fact that the message archive 58 is implemented as a stack memory or the like and the position of a message 28 in the message archive 58 simultaneously codes the occurrence of the message. Therefore, the position then directly takes the place of an item of time information and does not emerge only as the result of a separately recorded item of time information.

Pattern recognition 60 is applied to the contents of the message archive 58 or an associated symbol sequence. The pattern recognition is based on rules created during analysis and are held in a rule memory 62. Automatic creation during analysis is based, for example, on the fact that a specific symbol sequence is initially all searched for successive pairs of symbols with the highest occurrence. A rule that then results relates to the symbols included in the recognized pattern. Here, the rule "X=de" illustrated in the rule memory 62 states that the successive messages/symbols "de" in a group (here pairs of successive messages/symbols) are expressed as a new message/a new symbol "X". Overall, this shortens the symbol sequence defined by the contents of the message archive 58 (the symbol sequence "Addec" etc. results in the symbol sequence "AdXc" etc. on account of pattern simplification 64).

The complexity of the rules on which the pattern recognition 60 and pattern simplification 64 are based is fundamentally unlimited, with the result that the symbol sequence which is illustrated already in shortened form in the lower part in FIG. 4 can be re-shortened (not re-illustrated) using a further rule, for example "Y=Xc".

Pattern recognition 60 as illustrated in FIG. 4 comes into consideration, for example, when it is necessary to eliminate further messages (referred to as a fault message below for the purpose of differentiation) lying between messages A, B, C, the occurrence of which is intended to be examined for patterns. As a result of the fact that the symbol sequence is shortened using the pattern simplification 64, a pattern with regard to the messages A, B, C 28 better emerges. With regard to the reduced symbol sequence, syntactic message analysis, which is used to recognize recurring message patterns, can now be performed as the search for patterns.

It is possible to present recognized recurring message patterns in a hit-list, i.e., in a form sorted according to the frequency with which the same message pattern occurs. The frequency distribution provides information relating to the number of times recurring message patterns occur and provides knowledge on the frequency of chains of effects. In addition, the hit-list contains statements on possible problematic devices (FIG. 1) and a statistical evaluation of the hit-list can reveal such devices. The information resulting therefrom and the information resulting overall from the hit-list can contribute to increasing the economic efficiency of the system and also to improving the engineering, i.e., the message planning.

The rules held in the rule memory 62 are regular mapping rules which make it possible to recognize recurring partial sequences in the symbol sequence expressed by the contents of the message archive 58, which is of interest to the planner, i.e., the specialist, who, when planning the system (FIG. 1), determines which events lead to which messages 28, when only a partial pattern is of interest for improving such planning. During the search for patterns, the method operates with purely formal methods, with the result that no information relating to the structure of the system and the underlying technical process 26 (FIG. 1) is presupposed. However, accurate knowledge of the system is needed to interpret patterns which have been found with regard to their importance to system operation. Filters make it possible to single out or exclude from the totality of all messages 28 a subset which satisfies particular criteria to analyze this subset or the remainder. For example, messages 28 are designated "incoming" when the event which triggers the message 28 occurs and are designated "outgoing" when the cause of the message 28 no longer exists. For example, only incoming messages 28 may therefore be analyzed to be able to track which causes have which "incoming" messages 28 as a knock-on effect. Such a filter is also helpful for hiding so-called flutter alarms. Flutter alarms become apparent because particular messages 28 with the same identification, i.e., the same message number, for example, repeatedly "arrive" and "leave" in rapid succession. The practice of differentiating between message sequences that occur at different locations in the automation system 10 (FIG. 1), i.e., a process control system implemented using the automation system 10, for example, is helpful with regard to being able to trace cause and effects. Such distinctions make it possible to consider, from the symbol sequence resulting from the contents of the message archive 58, only those symbols (and thus the underlying messages 28 in each case) which relate to particular devices 12, 14, 16, 20, 22, 24 or system parts. An associated advantage becomes more apparent, the more comprehensive the system.

In accordance with the invention, a method is thus provided for analyzing a set of messages 28 in which the set of messages is reduced based on pattern recognition 60 and pattern simplification 64, where such pattern recognition 60 and pattern simplification 64 is based on regular grammar rules, and a search is performed for patterns in the remaining messages 28 or else directly, i.e., without previous simplification. In addition, syntactic pattern recognition 60 comes into consideration for any type of pattern search and a finite automaton (FIG. 3) is able to be derived using the regular grammar on which the pattern recognition 60 is based in each case by transforming the mapping rules into transition functions, which automaton can be used to graphically represent structural relationships between the messages 28.

Figure 5:
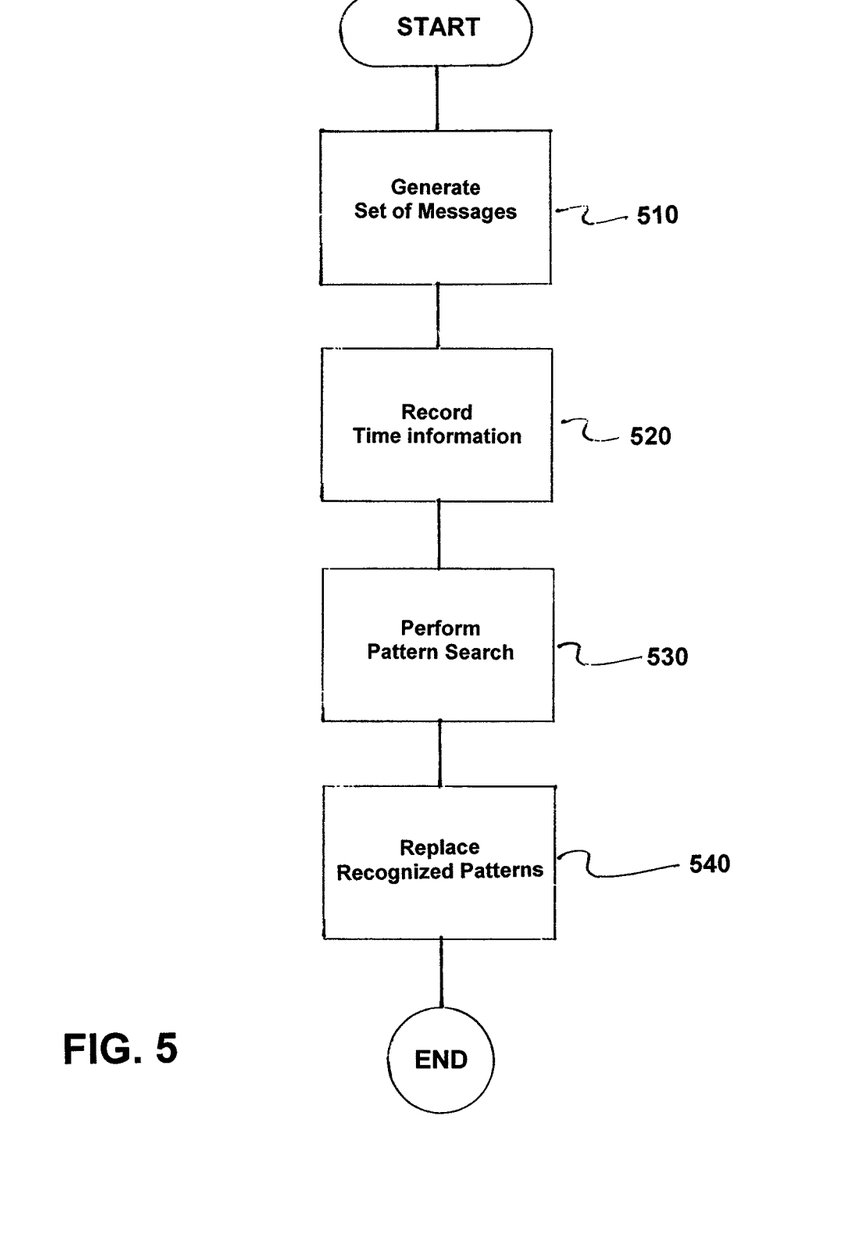
FIG. 5 is a flow chart of a method in accordance with an embodiment of the invention.

FIG. 5 is a flow chart of a method for analysing messages. The method comprises generating a set of messages while at least one of controlling and monitoring a technical process, as indicated in step 510.

An item of time information that codes an occurrence of the messages and a characteristic identification are recorded for each message in the set of messages, as indicated in step 520.

A search is performed by a computer for patterns in a sequence of characteristic identifications sorted according to the time information, as indicated in step 530.

Recognized patterns are replaced with a pattern identification which characterizes the pattern, as indicated in step 540.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for analyzing messages, comprising:
generating a set of messages while at least one of controlling and monitoring a technical process;
recording, for each message in the set of messages, an item of time information which codes an occurrence of said messages, and a characteristic identification which codes the messages according to at least one of a message type and a message content;
performing, by a computer, a search within characteristic identifications based on syntactic pattern recognition for patterns of a group of successive characteristic identifications within a sequence of characteristic identifications sorted according to the time information, the group of successive characteristic identifications comprising pairs of successive characteristic identifications; and
replacing recognized patterns with a pattern identification which characterizes the pattern.

2. The method as claimed in claim 1, wherein recognized patterns are shortened by at least one regular grammar rule.

3. The method as claimed in claim 2, further comprising deriving a corresponding finite automaton from the regular grammar used for the shortening operation.

4. The method as claimed in claim 1, wherein those characteristic identifications belonging to messages satisfying predefined or predefinable criteria are hidden in the sequence of characteristic identifications sorted according to the time information.

5. The method as claimed in claim 4, wherein the predefined or predefinable criteria relates to affiliation of the message to at least one of a system part of the technical process and an automation system intended to at least one of control and monitor the technical process.

6. The method as claimed in claim 1, further comprising representing recognized patterns occurring at a frequency exceeding a predefined or predefinable threshold value in a hit-list.

7. The method as claimed in claim 1, further comprising forming a message window using an interval of time between successive patterns, the interval of time exceeding a predefined or predefinable threshold value.

8. A method for operating an automation device which generates or receives messages, the method comprising:
recording, in a memory, for each message of said messages, a characteristic identification which codes the messages according to at least one of a message type and a message content, and an item of time information which codes the occurrence of the message;
performing, by a computer, a search within characteristic identifications based on syntactic pattern recognition for patterns of a group of successive characteristic identifications within a sequence of characteristic identifications sorted according to the time information, the group of successive characteristic identifications comprising pairs of successive characteristic identifications; and
replacing recognized patterns with a pattern identification which characterizes the pattern.

9. The method as claimed in claim 8, wherein recognized patterns are shortened by at least one regular grammar rule.

10. The method as claimed in claim 9, further comprising deriving a corresponding finite automaton from the regular grammar used for the shortening operation.

11. The method as claimed in claim 8, wherein those characteristic identifications belonging to messages satisfying predefined or predefinable criteria are hidden in the sequence of characteristic identifications sorted according to the time information.

12. The method as claimed in claim 11, wherein the predefined or predefinable criteria relates to affiliation of the message to at least one of a system part of the technical process and an automation system intended to at least one of control and monitor the technical process.

13. The method as claimed in claim 8, wherein the automation device at least one of generates the messages and receives the messages from one of the technical process and from other automation devices involved in controlling or monitoring the technical process.

14. The method as claimed in claim 8, further comprising representing recognized patterns occurring at a frequency exceeding a predefined or predefinable threshold value in a hit-list.

15. The method as claimed in claim 8, further comprising forming a message window using an interval of time between successive patterns, the interval of time exceeding a predefined or predefinable threshold value.

16. A non-transitory storage medium encoded with a computer program which, when executed on a computer, causes the computer to analyze messages, the computer program comprising:
program code for generating a set of messages while at least one of controlling and monitoring a technical process;
program code for recording, for each message in the set of messages, an item of time information which codes an occurrence of said messages, and a characteristic identification which codes the messages according to at least one of a message type and a message content;
program code for performing, by a computer, a search within characteristic identifications based on syntactic pattern recognition for patterns of a group of successive characteristic identifications within a sequence of characteristic identifications sorted according to the time information, the group of successive characteristic identifications comprising pairs of successive characteristic identifications; and
program code for replacing recognized patterns with a pattern identification which characterizes the pattern.

17. A computer system including the non-transitory storage medium as claimed in claim 16.

18. A method for analyzing messages, comprising:
generating a set of messages while at least one of controlling and monitoring a technical process;
recording, for each message in the set of messages, an item of time information which codes an occurrence of said messages, and a characteristic identification;

performing, by a computer, a search within characteristic identifications based on syntactic pattern recognition for patterns of a group of successive characteristic identifications within a sequence of characteristic identifications sorted according to the time information, the group of successive characteristic identifications comprising pairs of successive characteristic identifications; and replacing recognized patterns with a pattern identification which characterizes the pattern;

wherein recognized patterns are shortened by at least one regular grammar rule.

\* \* \* \* \*